United States Patent
Aono

(10) Patent No.: US 7,967,899 B2
(45) Date of Patent: Jun. 28, 2011

(54) ACTIVATED CARBON AND CANISTER USING THE SAME

(75) Inventor: Hirokazu Aono, Shizuoka (JP)

(73) Assignee: Cataler Corporation, Kakegawa (JP)

( * ) Notice: Subject to any disclaimer, the term of this patent is extended or adjusted under 35 U.S.C. 154(b) by 265 days.

(21) Appl. No.: 12/084,790

(22) PCT Filed: Jan. 4, 2007

(86) PCT No.: PCT/JP2007/050001
§ 371 (c)(1),
(2), (4) Date: May 9, 2008

(87) PCT Pub. No.: WO2007/077985
PCT Pub. Date: Jul. 12, 2007

(65) Prior Publication Data
US 2009/0139407 A1   Jun. 4, 2009

(30) Foreign Application Priority Data

Jan. 6, 2006 (JP) .................................. 2006-001699

(51) Int. Cl.
*B01D 53/02* (2006.01)
(52) U.S. Cl. ........... 96/154; 96/108; 95/146; 423/445 R; 502/416
(58) Field of Classification Search .................... 96/108, 96/154; 95/146; 423/445 R; 502/416
See application file for complete search history.

(56) References Cited

U.S. PATENT DOCUMENTS

| | | | | |
|---|---|---|---|---|
| 4,128,499 A | * | 12/1978 | Cohen | 252/378 R |
| 5,227,552 A | * | 7/1993 | Chang et al. | 585/257 |
| 5,276,000 A | * | 1/1994 | Matthews et al. | 502/424 |
| 6,696,384 B2 | * | 2/2004 | McCrae et al. | 502/180 |
| 2005/0014642 A1 | | 1/2005 | Oi et al. | |
| 2008/0041226 A1 | * | 2/2008 | Hiltzik et al. | 95/90 |

FOREIGN PATENT DOCUMENTS

| | | |
|---|---|---|
| JP | 10-314588 A | 12/1998 |
| JP | 2000-313611 A | 11/2000 |
| JP | 2005-35812 A | 2/2005 |

OTHER PUBLICATIONS

Translation of JP 10-314588 A (Chiyoda Corp.), Dec. 2, 1998.*

* cited by examiner

*Primary Examiner* — Robert J Hill, Jr.
*Assistant Examiner* — Christopher P Jones
(74) *Attorney, Agent, or Firm* — Birch, Stewart, Kolasch & Birch, LLP

(57) ABSTRACT

Activated carbon in which the residual amount of hydrocarbon (HC) can be reduced and a canister using such activated carbon are provided. Activated carbon in which the residual amount of butane is determined to be 1.2 g/100 ml or less after butane is adsorbed thereon and desorbed therefrom in accordance with the determination of BWC (ASTM D-5228) and a canister using such activated carbon as an adsorbent are provided.

4 Claims, 1 Drawing Sheet

ACTIVATED CARBON AND CANISTER USING THE SAME

BACKGROUND OF THE INVENTION

1. Field of the Invention

The present invention relates to activated carbon that is excellent in terms of not only adsorptivity but also desorptivity of organic gas. In addition, the present invention relates to a canister using, as an adsorbent, such activated carbon that is excellent in terms of adsorptivity and desorptivity of organic gas.

2. Background Art

Because of high volatility, gasoline used as fuel for automobiles is vaporized in a fuel tank when a vehicle is running or is left parked in strong sunlight, and the produced gasoline vapor is released into the atmosphere. Gasoline vapor is also generated during refueling.

To prevent gasoline vapor from being released to the outside of a vehicle, a canister in which activated carbon as an adsorbent adsorbs gasoline vapor is provided for the vehicle. For instance, when an internal combustion engine for automobiles contains a canister capable of adsorbing and desorbing fuel vapor, emission of fuel vapor that has evaporated from the fuel tank of a vehicle to the outside is prevented. In such a canister, fuel vapor generated after a vehicle stops running is temporarily adsorbed. In addition, the adsorbed fuel component is desorbed together with newly adsorbed vapor so as to be subjected to combustion treatment in the internal combustion engine during the subsequent running.

This adsorbent in a canister also serves to adsorb gasoline vapor generated during refueling. The adsorbed gasoline vapor is desorbed (purged) from activated carbon in accordance with engine rotation, directed into the engine via a suction pipe with air taken in from the outside, and burned therein.

Meanwhile, adsorption performance of activated carbon as an adsorbent for fuel gradually deteriorates due to repetition of adsorption and desorption of organic gas (vapor) such as gasoline. When the amount of vapor generated in a fuel tank exceeds the adsorption performance of activated carbon in a canister upon vapor generation, vapor is released to the outside of the vehicle, resulting in generation of an abnormal odor, etc.

Hitherto, activated carbon in a canister has been used without being subjected to any treatment, or polarity has been imparted to such activated carbon for the purpose of improving adsorption performance, for example.

In general, activated carbon is produced in a manner such that a starting material thereof is subjected to carbonization followed by activation. Activated carbon has pores for adsorption of gasoline vapor. Activation is a step of developing such pores and controlling pore diameters. Activated carbon used for a canister has been required to have pores with large opening diameters (20-50 Å) for adsorption and desorption of gasoline vapor. Such pores with large diameters have been created by carrying out advanced activation or chemical activation under more stringent conditions than those applied to usual forms of activation treatment.

As described above, a desired adsorbent used in a canister is an adsorbent that adsorbs an organic gas such as gasoline and desorbs the gas after a certain period of time for adsorption so that large amounts of adsorption and desorption can be achieved. This is because such adsorbent can maintain its performance without deterioration even after being repeatedly used.

Even if gasoline vapor adsorbed on activated carbon in the canister is subjected to desorption (purging) with air (suction air), a part of the adsorbed gasoline vapor remains on activated carbon, and with a rise of temperature when a vehicle is left parked, a residual gasoline vapor is desorbed from activated carbon and released outside the vehicle.

Especially in the case of conventional activated carbon, which has a wide pore diameter distribution, pores with small opening diameters have higher adsorptivity than pores with large opening diameters, making it difficult for the adsorbate to get desorbed (purged). Therefore, the adsorbate (residue) that remains adsorbed in pores with small opening diameters exists in a large quantity, resulting in a leakage of gasoline vapor upon increase of ambient temperature. Thus, the amount of hydrocarbon released (exhausted) into the atmosphere (bleed emissions) increases when a vehicle is left parked, which has been problematic.

In JP Patent Publication (Kokai) No. 2004-256335 A, it was found that the residue remains adsorbed in the pores with small opening diameters of activated carbon used as an adsorbent. The document discloses that a method for producing activated carbon wherein pores with small opening diameters are occluded is effective in reducing residual amounts of gasoline vapor, such that leakage of such gasoline vapor is minimized, and is also effective in inhibiting bleed emissions of gasoline vapor into the atmosphere. Specifically, an organic compound is adsorbed on activated carbon having pores with a wide range of diameters so as to selectively occlude pores with small diameters.

Meanwhile, when vapor enters in pores of activated carbon in a canister, vapor forms a primary adsorption layer on the surfaces inside the pores via Van der Waals force due to molecular interaction. Further, liquid layers formed with vapor as a result of the Kelvin effect due to capillary condensation are adsorbed on the primary adsorption layer in a sequential manner. Upon engine purging, an adsorbate in the upper layer starts to become desorbed.

However, upon engine purging, an adsorbate in the primary adsorption layer is unlikely to be desorbed due to a relatively strong bond between the adsorbate and activated carbon. In particular, a component of the adsorbate having a high boiling point is more unlikely to be desorbed than a component having a low boiling point. Thus, the component having a high boiling point tends to remain in the pores. That is, when a component of an adsorbate is desorbed from the primary adsorption layer, such component having a low boiling point is desorbed from the pores, and such component having a high boiling point is adsorbed in the pores after desorption of the component having a low boiling point, such that the volume of the component having a high boiling point gradually increases. As a result, deterioration of activated carbon progresses. In addition, the component having a high boiling point has a large molecular weight so that it occupies a large part of the volume inside each pore. Thus, the volume inside each pore is reduced and adsorption performance further deteriorates.

When using a conventional porous adsorbent made of activated carbon or the like, a substrate or a surface functional group of such adsorbent influences whether hydrophobic or hydrophilic adsorption takes places. In addition, a desired adsorbent may be an adsorbent that achieves large amounts of adsorption and desorption after adsorption for a certain period of time followed by desorption. In such case, needless to say, the surface area, pore distribution, and the like of the adsorbent largely influence amounts of adsorption and desorption. Hydrophobicity and hydrophilicity of an adsorbent can be advantageous or problematic factors. Hydrophobicity and hydrophilicity of an adsorbent influence the condition of adsorption and desorption where the amount of adsorption is small with respect to an adsorbate, or where the amount of adsorption is large with respect to an adsorbate and the amount of desorption is small.

When considering the hydrophobicity and hydrophilicity of the aforementioned adsorbent, the adsorbent is selected depending on the hydrophobicity or hydrophilicity of an adsorbate of interest. When the adsorbent is repeatedly used for adsorption and desorption, an adsorbent that achieves a large amount of desorption after adsorption (a small residual amount of adsorbate left after desorption) is required. When an adsorbate and the surface of an adsorbent share the same properties, the amount of adsorption increases while the amount of desorption decreases.

For instance, as in the case of activated carbon used for a canister, when hydrocarbon components are adsorbed on or desorbed from activated carbon, a pore distribution that results in an increased amount of adsorption causes adsorption retentivity to increase, leading to the decreased amount of desorption. Thus, the amount of adsorption significantly decreases in the subsequent adsorption. In addition, a pore distribution that results in an increased amount of desorption causes adsorption retentivity to decrease. Thus, the amount of adsorption significantly decreases or the hardness of activated carbon is reduced upon advanced activation whereby pore sizes become enlarged. The above phenomena have been problematic.

SUMMARY OF THE INVENTION

In view of above circumstances, it is an objective of the present invention to provide activated carbon in which a residual amount of hydrocarbon (HC) can be reduced and a canister using the same.

Inventors of the present invention have found that the amounts of hydrocarbon adsorbed on and desorbed from activated carbon increase by imparting water repellency and oil repellency to the surface of activated carbon such that the surface conditions of activated carbon do not influence adsorption and desorption in pores of activated carbon. This has led to the completion of the present invention.

Specifically, in a first aspect, the present invention relates to activated carbon that is defined based on a residual amount of butane. When butane is adsorbed on and desorbed from the activated carbon in accordance with the determination of BWC (ASTM D-5228), the residual amount of butane is 1.2 g/100 ml or less, and more preferably 1.0 g/100 ml or less. Here, butane is a representative example of a volatile hydrocarbon and is an index of the entire group of volatile hydrocarbons.

When the activated carbon of the present invention is more specifically defined, preferably, its n-butane working capacity (BWC) in accordance with the determination of BWC (ASTM D-5228) is 14 g/100 ml or greater.

In a second aspect, the activated carbon of the present invention is treated with a fluorinated solvent and/or fluorinated gas. The thus treated activated carbon complies with requirements concerning the above residual amount of butane and the n-butane working capacity (BWC).

Water repellent and oil repellent components are applied to pore walls of activated carbon such that the affinity of the activated carbon for an adsorbate of interest reduce. Thus, an adsorbate at a certain concentration or higher other than that at a low concentration is adsorbed on such activated carbon. Specifically, when such activated carbon is used for a canister, hydrocarbon (HC) at a high concentration is adsorbed and a large amount of hydrocarbon (HC) at a low concentration is desorbed due to an oil repellent effect. Thus, activated carbon having a low residual amount of an adsorbate can be obtained while performance in terms of adsorption and desorption of hydrocarbon (HC) is maintained, which is a required aspect of performance of activated carbon used for a canister of the present invention.

In a third aspect, the present invention relates to a canister using the aforementioned activated carbon as an adsorbent. The configuration of such canister is not particularly limited; however, the activated carbon as an adsorbent of the present invention is preferably used at least at a part of the canister located close to an atmosphere port. In addition, preferably, the present invention includes a canister with a multi-layered structure.

The residual amount of hydrocarbon (HC) in the activated carbon of the present invention can be reduced compared with that in conventional activated carbon. Thus, a canister using the activated carbon of the present invention as an adsorbent adsorbs and desorbs large amounts of hydrocarbon (HC), and is excellent in terms of durability.

DESCRIPTION OF THE PREFERRED EMBODIMENTS

Figure 1:
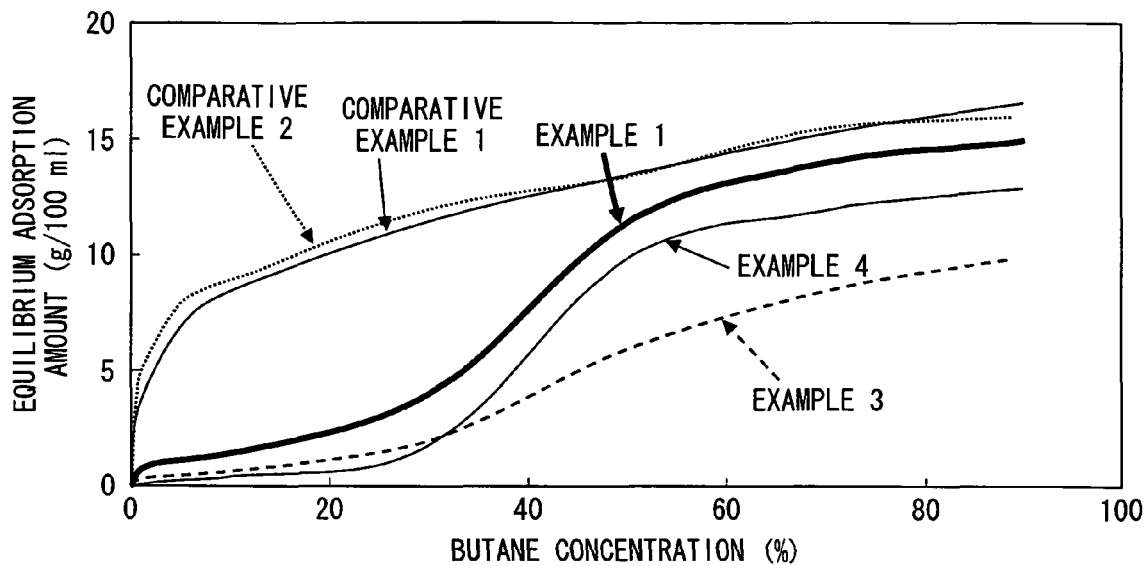
FIG. 1 shows isotherms of butane adsorption determined based on the relationship between butane concentrations and equilibrium adsorption amounts.

Examples of the activated carbon that can be used in the present invention include activated products obtained using various types of starting materials such as coal, coconut shells, wood, lignin, and the like; and activated products obtained by steam activation or chemical activation using phosphoric acid, zinc chloride, alkali metal, and the like. Of these, wood-base activated products obtained by phosphoric acid activation are preferable. In view of formability and strength of molded activated carbon, the particle size of such activated carbon in a powdered form is generally 0.5 mm or less, and preferably between 0.05 and 0.15 mm. That is, the particle size is preferably 200 mesh pass (60% to 95%). In addition, the particle size is preferably between 100 mesh pass (60% or more) and 325 mesh pass (50% or less), more preferably between 100 mesh pass (80% or more) and 325 mesh pass (40% or less), and further preferably between 100 mesh pass (80% to 90%) and 325 mesh pass (20% to 40%). In addition, a specific surface of activated carbon applied to the present invention is generally 500 to 2500 $m^2/g$, preferably 1000 to 2000 $m^2/g$, and more preferably 1500 to 2000 $m^2/g$. When the specific surface is too small, it is difficult to obtain sufficient adsorption performance, while on the other hand, when the specific surface is too large, it is difficult to obtain sufficient strength.

The activated carbon of the present invention is obtained by allowing the activated carbon described above as a starting material to be subjected to water or oil repellent treatment. Upon water repellent treatment, preferably, the activated carbon is treated with various types of agents such as phosphoric ester. Upon oil repellent treatment, preferably, the activated carbon is treated with a fluorinated solvent and/or fluorinated gas.

The activated carbon of the present invention can be molded by kneading powdered activated carbon, clay, metallic powder of solid heat-strong material, and boron compound and/or phosphorus compound with the addition of a plasticizer such as water if necessary, forming the resulting product, and baking it. In general, kneading may be carried out to such an extent that the kneaded product can be shaped by hand after kneading a starting material using a mixer such as a kneader at room temperature such that plasticity is imparted to the kneaded product. The water used for kneading may be added in an amount to such an extent that the kneaded product can be shaped by hand. In general, 50 to 200 parts by weight, and more preferably 100 to 150 parts by weight, of water are added to 100 parts by weight of activated carbon. Then, the kneaded product is extruded and molded into a desired form, such as a cylindrical or spherical form, using an adequate molding machine such as a press, such that granulated activated carbon can be obtained. Preferably, granulated activated carbon is produced via granulation by extrusion, the thus obtained granulated activated carbon is crushed using an adequate crusher according to need, and it is then subjected to sizing. Thus, granulated crushed activated carbon having a particle size within the desired scope can be obtained. Thereafter, the thus obtained granulated activated carbon or granulated crushed activated carbon is subjected to baking, in general, at a temperature between 400° C. and 1000° C., and preferably between 500° C. and 900° C., under a gas atmosphere containing no oxygen. It is then subjected to steam activation or chemical activation at a temperature of between 700° C. and 1200° C., and desirably between 900° C. and 1000° C. Thus, the molded activated carbon of interest can be obtained. In addition, prior to baking, it is preferable to allow granulated carbon to be subjected to tumbling treatment using an apparatus for tumbling such as a tumbler tester, whereby smoothness is imparted to the surface of granulated carbon so as to increase bulk density. In general, tumbling treatment is performed at about 30 to 300 rpm and preferably about 50 to 100 rpm for about 10 minutes to 10 hours, and preferably for about 30 minutes to 3 hours. Before or after baking, washing or drying treatment may be carried out if necessary. Washing may be carried out, unless it influences the adsorption performance of activated carbon. In general, washing is carried out using deionized water, tap water, or the like for about several tens of seconds to several hours, and preferably for about 10 minutes to 1 hour, with heating according to need. The condition for heating is between 30° C. and 100° C. The activated carbon may be subjected to boiling. The temperature condition for drying is, in general, between about 50° C. and 200° C., and preferably between about 100° C. and 150° C., for about 30 minutes to 50 hours, and preferably for about 1 to 10 hours.

The molded activated carbon obtained in the present invention has a crushing strength of 1 kg or more, and preferably between 1 and 15 kg. The typical crushing strength thereof can be determined on the assumption of molded activated carbon having a shape with a size of 2.5 mm in diameter and 4 mm in length. The molded activated carbon of the present invention is preferably used in a canister of a vehicle. In such case, the crushing strength is preferably 3 kg or more. When the crushing strength is too low, activated carbon becomes pulverized when being filled into or used in a canister, resulting in the increased air-flow resistance (pressure loss). In a technique of measuring Kiya crushing strength, a sample of interest is placed on a sample stage, a cylinder for pressurizing the sample is allowed to descend gradually, and pressure is applied to the sample using the bottom surface of the cylinder. Records of resistance values of the sample and weights of pressure applied to the sample are tracked in response to increases in pressure applied to the sample. When the sample is crushed, the crushed sample is disposed in a state of non-contact with the bottom surface of the cylinder, resulting in a resistance value of zero. The weight of pressure applied to the sample at such time indicates the hardness of the sample. Measurement can easily be carried out using a commercially available Kiya hardness tester. In the present invention, the strength of molded activated carbon is expressed as a Kiya crushing strength of granulated carbon that has been molded into a shape with a size of 2.5 mm in diameter and 4 mm in length. The strength is 1 kg or more, and it is preferably between 3 kg and 15 kg.

In view of prevention of temperature increase of activated carbon upon adsorption of gasoline vapor and inhibition of temperature decrease of activated carbon after purging of gasoline vapor adsorbed on activated carbon, preferably, the molded activated carbon of the present invention has a specific heat (25° C.) 0.4 J/K·cc or more, and more preferably of 0.5 J/K·cc. When the specific heat is too low, adsorption and desorption effects cannot be obtained. In general, based on a specific heat of the solid heat-retaining material used, the upper limit of the aforementioned specific heat is about 0.8 J/K·cc.

When the above activated carbon is applied as an adsorbent of a canister, it can be used in various types of configuration. For instance, activated carbon molded in a given size may be used, or crushed activated carbon may be used after being sieved in accordance with a given mesh size.

Further, in a case where a canister used for automobiles is filled with activated carbon of the present invention, the average particle size of activated carbon subjected to molding is preferably between 0.5 and 5 mm, and more preferably between 2 and 3 mm. In addition, the length of such molded activated carbon is between about 0.5 and 10 mm, and preferably between about 3 and 5 mm. When the average particle size is too small, air-flow resistance increases, while on the other hand, when it is too large, the density of the activated carbon filling decreases, resulting in performance deterioration. Since the activated carbon of the present invention has properties described above, the activated carbon has ability to adsorb and desorb evaporative fuel such as gasoline in an amount about 0.009 to 0.012 g as a leakage amount ($2^{nd}$ time) in the DBL test indicated below when the density of the activated carbon filling is 0.6 to 0.8 g/cc. Thus, preferably, the activated carbon can be used as an adsorbent in an apparatus for collecting evaporative fuel (canister).

EXAMPLES

Hereafter, the present invention will be described by referring to examples and comparative examples.

Example 1

Activated carbon was coated with a fluorinated solvent (fluorine content: 8 wt %) at a ratio of carbon to solvent of 100:10. The resultant was subjected to drying treatment in the atmosphere at a temperature of 150° C.

Example 2

Activated carbon was kept at a temperature of 200° C. under a flow of high-temperature fluorinated gas comprising 10% fluorine and $N_2$.

Comparative Example 1

Untreated activated carbon was used as it was.

Example 3

Activated carbon was coated with a fluorinated solvent (fluorine content: 8 wt %) at a ratio of carbon to solvent of 100:50. The resultant was subjected to drying treatment in the atmosphere at a temperature of 70° C.

Example 4

Activated carbon was impregnated with a hydrophilic solvent comprising phosphoric ester.

Comparative Example 2

Activated carbon was impregnated with a lipophilic solvent comprising light oil.

FIG. 1 shows the relationship between butane concentrations and equilibrium adsorption amounts. Based on the figure, isotherms of butane adsorption were determined. Results shown in FIG. 1 indicate that the activated carbon of Examples 1, 3, and 4 of the present invention is excellent in terms of adsorptivity of butane at a high concentration compared with the cases of Comparative Examples 1 and 2

Figure 2:
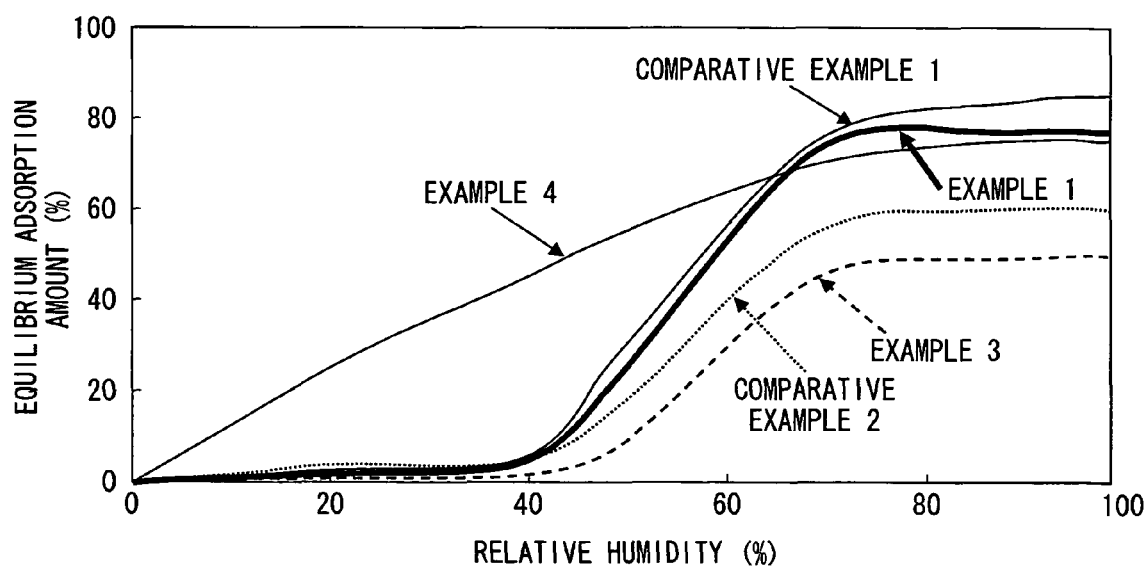
FIG. 2 shows hygroscopic properties determined based on the relationship between relative humidities and equilibrium adsorption amounts.

FIG. 2 shows the relationship between relative humidities and equilibrium adsorption amounts. Based on the figure, hygroscopic properties were determined.

Table 1 shows the results of the determination of BWC. The results shown in table 1 indicate amounts of adsorption, residual amounts, and n-butane working capacities (BWC: amounts of desorption) in accordance with the determination of BWC (ASTM D-5228). The units used in the figure are g/100 ml. Based on the results shown in table 1, each of the resulting residual amounts of butane in Examples 1, 2, 3, and 4 of the present invention was 1.2 g/100 ml or less. Thus, the activated carbon of Examples 1, 2, 3, and 4 was found to have particularly excellent desorptivity.

TABLE 1

|  | Amount of Adsorption | Residual Amount | BWC (Amount of Desorption) |
|---|---|---|---|
| Example 1 | 15.02 | 0.96 | 14.06 |
| Example 2 | 14.58 | 1.08 | 13.50 |
| Comparative Example 1 | 17.01 | 3.08 | 13.92 |
| Example 3 | 10.60 | 0.52 | 10.07 |
| Example 4 | 13.30 | 0.50 | 12.80 |
| Comparative Example 2 | 15.95 | 2.00 | 13.95 |

The above results indicate the following. In the case of each of the Examples, the amount of adsorbed butane at a low concentration was small, which in turn indicates occurrence of adsorption of butane at a high concentration. In these examples, similar effects were exhibited in activated carbon subjected to water repellent or oil repellent treatment. In addition, based on the evaluation of adsorption and desorption of butane, activated carbon having the same level of BWC (amount of desorption), in which the residual amount of butane was small, was obtained. In Comparative Example 1, since activated carbon is originally lipophilic, butane at a low concentration was adsorbed prior to the adsorption thereof at a high concentration.

When the activated carbon of the present invention is used, the amounts of adsorption and desorption do not decrease compared with those of conventional activated carbon, and the residual amount of hydrocarbon (HC) can be reduced without deterioration of the strength of activated carbon, for example. Thus, a canister using such activated carbon as an adsorbent achieves the increased amounts of hydrocarbon (HC) adsorption and desorption and is excellent in terms of durability. Therefore, such canister contributes to the inhibition of volatilization of hydrocarbon gas such as gasoline in to the atmosphere.

What is claimed is:

1. Activated carbon having pores with opening diameters of 20-50 Å, which has been treated with a fluorinated solvent and/or fluorinated gas, which has a particle size of 0.05 to 0.5 mm, and in which the residual amount of butane is 1.2 g/100 ml or less after butane is adsorbed thereon and desorbed therefrom in accordance with the determination of BWC (ASTM D-5228), and which has been molded and exhibits a specific heat of 25° C. of 0.4 J/K·cc or more.

2. The activated carbon according to claim 1, in which n-butane working capacity (BWC) is 14 g/100 ml or more in accordance with the determination of BWC (ASTM D-5228).

3. A canisters which contains the activated carbon according to claim 1.

4. The canister according to claim 3, in which the activated carbon as an adsorbent is used at least at a part of the canister located close to an atmosphere port.

* * * * *